US009613275B2

(12) United States Patent
Yang

(10) Patent No.: US 9,613,275 B2
(45) Date of Patent: Apr. 4, 2017

(54) METHOD AND SYSTEM FOR A MOBILE TERMINAL TO ACHIEVE USER INTERACTION BY SIMULATING A REAL SCENE

(71) Applicant: HUIZHOU TCL MOBILE COMMUNICATION CO., LTD., Huizhou, Guangdong (CN)

(72) Inventor: Yan Yang, Huizhou (CN)

(73) Assignee: HUIZHOU TCL MOBILE COMMUNICATION CO., LTD, Huizhou (CN)

(*) Notice: Subject to any disclaimer, the term of this patent is extended or adjusted under 35 U.S.C. 154(b) by 32 days.

(21) Appl. No.: 14/785,510

(22) PCT Filed: Jun. 4, 2014

(86) PCT No.: PCT/CN2014/079131
§ 371 (c)(1),
(2) Date: Oct. 19, 2015

(87) PCT Pub. No.: WO2015/154333
PCT Pub. Date: Oct. 15, 2015

(65) Prior Publication Data
US 2016/0098601 A1 Apr. 7, 2016

(30) Foreign Application Priority Data
Apr. 10, 2014 (CN) .......................... 2014 1 0141875

(51) Int. Cl.
*G06K 9/00* (2006.01)
*G06K 9/22* (2006.01)
(Continued)

(52) U.S. Cl.
CPC ..... *G06K 9/00677* (2013.01); *G06K 9/00671* (2013.01); *G06K 9/22* (2013.01);
(Continued)

(58) Field of Classification Search
CPC . G06K 9/00; H04N 1/00; H04M 1/00; H04W 4/00
(Continued)

(56) References Cited

U.S. PATENT DOCUMENTS

| 8,229,454 B1* | 7/2012 | Yoakum ............ H04M 3/42357 455/414.2 |
| 8,577,156 B2* | 11/2013 | Stankiewicz ........ G06K 9/4671 382/103 |
| 2014/0093222 A1 | 4/2014 | Degani et al. |

FOREIGN PATENT DOCUMENTS

| CN | 102148818 A | 8/2011 |
| CN | 102419917 A | 4/2012 |
| CN | 103616966 A | 3/2014 |

OTHER PUBLICATIONS

CN102148818A English Translation.
CN102419917A English Translation.
CN103616966A English Translation.

* cited by examiner

*Primary Examiner* — Abolfazl Tabatabai
(74) *Attorney, Agent, or Firm* — Ladas & Parry LLP

(57) ABSTRACT

A method and a system for a mobile terminal to achieve user interaction by simulating a real scene are disclosed. The method comprises: formulating a scene task for a 3D virtual scene; uploading the information of the 3D virtual scene and the scene task to a server to obtain a shared link; searching for and transmitting the shared link to nearby mobile terminals, sending an invitation and waiting for participation of the nearby mobile terminals; if the invitation is received by the nearby mobile terminals, then reading the information of the 3D virtual scene and the scene task and uploading corresponding personal information by the nearby mobile terminals; and changing locations of user roles in the 3D virtual scene according to positioning information of the
(Continued)

mobile terminal, receiving a user operation instruction to make interactions via the user roles, and recording the user behaviors corresponding to the personal information.

19 Claims, 2 Drawing Sheets

(51) Int. Cl.
*H04N 13/00* (2006.01)
*H04N 13/02* (2006.01)
*H04W 4/02* (2009.01)
*H04L 29/06* (2006.01)
*H04M 1/725* (2006.01)
*H04N 5/225* (2006.01)
*H04W 4/00* (2009.01)
*H04W 36/00* (2009.01)
*H04W 88/04* (2009.01)

(52) U.S. Cl.
CPC ........ *H04L 67/38* (2013.01); *H04M 1/72522* (2013.01); *H04N 13/0011* (2013.01); *H04N 13/0055* (2013.01); *H04N 13/0059* (2013.01); *H04N 13/026* (2013.01); *H04N 13/0282* (2013.01); *H04W 4/023* (2013.01); *H04M 1/72572* (2013.01); *H04W 88/04* (2013.01)

(58) Field of Classification Search
USPC .................................. 382/103, 236; 348/169
See application file for complete search history.

METHOD AND SYSTEM FOR A MOBILE TERMINAL TO ACHIEVE USER INTERACTION BY SIMULATING A REAL SCENE

RELATED APPLICATION

This application is a national phase entry under 35 USC 371 of International Patent Application No. PCT/CN2014/079131 filed on 4 Jun. 2014, which claims priority from Chinese Patent Application No. 201410141875.3 filed on April 10, 2014, the disclosures of which are incorporated in their entirety by reference herein.

FIELD OF THE INVENTION

The present disclosure generally relates to mobile terminals, and more particularly, to a method and a system for a mobile terminal to achieve user interaction by simulating a real scene.

BACKGROUND OF THE INVENTION

People often take part in some activities such as mountaineering, swimming and running, and there will be less fun if no interaction is made during the activities. However, the existing interaction activities are mostly organized in advance. In the real life, users sharing the same interests may participate a same organization (e.g., a Q group, a MoMo group and etc.), but it is difficult to gather these users sharing the same interests together for an activity, unless there is someone who organizes such an activity.

Actually, when someone is taking an activity (e.g., running in a park, mountaineering and etc.), there may be some other people who are also taking the same activity at the same time and in the same place. However, no conventional technologies can be used to gather these people, who take the activity individually and don't known each other, together.

Accordingly there is a need to make improvements and advancements on the conventional technologies.

SUMMARY OF THE INVENTION

In view of the aforesaid shortcomings of the prior art, an objective of the present disclosure is to provide a method and a system for a mobile terminal to achieve user interaction by simulating a real scene, which can solve the problem of the prior art that people who are taking the same activity at the same time and in the same place cannot be gathered together in time to know each other via the mobile terminal.

To achieve the aforesaid objective, technical solutions adopted by the present disclosure are as follows.

A method for a mobile terminal to achieve user interaction by simulating a real scene is provided, which comprises the following steps of:

A. invoking a preset 3D virtual scene corresponding to the real scene and formulating a scene task for the 3D virtual scene, or using a real scene photo captured by the mobile terminal to form a 3D virtual scene corresponding to the real scene and then formulating a scene task for the 3D virtual scene by the mobile terminal;

B. uploading information of the 3D virtual scene and information of the scene task by the mobile terminal to a server to obtain a shared link;

C. searching for nearby mobile terminals and transmitting the shared link to the nearby mobile terminals, sending an invitation to the nearby mobile terminals and waiting for participation of the nearby mobile terminals by the mobile terminal;

D. if the invitation is received by the nearby mobile terminals, then reading the information of the 3D virtual scene and the information of the scene task stored in the server and uploading the corresponding personal information by the nearby mobile terminals; and E. changing locations of user roles in the 3D virtual scene according to positioning information of the mobile terminal, receiving a user operation instruction to make interaction operations via the user roles, and corresponding to the personal information, recording and saving the interaction operation behaviors by the mobile terminal.

Preferably, in the method for a mobile terminal to achieve user interaction by simulating a real scene, the formulating a scene task for the 3D virtual scene specifically comprises:

formulating a scene task according to the 3D virtual scene or selecting pre-formulated scene task.

Preferably, in the method for a mobile terminal to achieve user interaction by simulating a real scene, the step B specifically comprises:

B1. uploading the information of the 3D virtual scene and the information of the scene task to the server by the mobile terminal;

B2. receiving and storing the information of the 3D virtual scene and the information of the scene task by the server to generate a shared link; and B3. transmitting the shared link back to the mobile terminal by the server.

Preferably, in the method for a mobile terminal to achieve user interaction by simulating a real scene, the step C specifically comprises:

C1. searching for nearby users by the mobile terminal through use of a location sharing module;

C2. transmitting the shared link to the nearby mobile terminals to invite the nearby users to participate; and C3. waiting for participation of the nearby users.

Preferably, the method for a mobile terminal to achieve user interaction by simulating a real scene further comprises the following step before the step E:

collecting opinions of the participating users to modify the virtual scene and the scene task.

Preferably, in the method for a mobile terminal to achieve user interaction by simulating a real scene, the scene task comprises: start time of task, number of participants, task, designated site of task.

Preferably, in the method for a mobile terminal to achieve user interaction by simulating a real scene, the step of searching for nearby mobile terminals is performed by the location information sharing technology.

Preferably, in the method for a mobile terminal to achieve user interaction by simulating a real scene, if a user of any of the nearby mobile terminals makes no response to the invitation within a certain time period, it regards that the user gives up an chance to take part in the scene task.

Corresponding to the aforesaid method, the present disclosure further provides a system for a mobile terminal to achieve user interaction by simulating a real scene, which comprises:

a scene and scene task formulating module, being for use by the mobile terminal to invoke a preset 3D virtual scene corresponding to the real scene and formulate a scene task for the 3D virtual scene, or to use a real scene photo captured by the mobile terminal to form a 3D virtual scene corresponding to the real scene and then formulate a scene task for the 3D virtual scene;

a transmitting module, being for use by the mobile terminal to upload the information of the 3D virtual scene and the information of the scene task to a server to obtain a shared link;

a searching and inviting module, being for use by the mobile terminal to search for nearby mobile terminals and transmit the shared link to the nearby mobile terminals, send an invitation to the nearby mobile terminals and wait for participation of the nearby mobile terminals;

an information reading and information transmitting module, being for use by the nearby mobile terminals to, if the invitation is received by the nearby mobile terminals, read the information of the 3D virtual scene and the information of the scene task stored in the server and upload the corresponding personal information; and a role execution and behavior recording module, being for use by the mobile terminal to change locations of user roles in the 3D virtual scene according to positioning information of the mobile terminal, receive a user operation instruction to make interaction operations via the user roles, and corresponding to the personal information, record and save the interaction operation behaviors.

Preferably, in the system for a mobile terminal to achieve user interaction by simulating a real scene, formulating a scene task for the 3D virtual scene specifically comprises:

formulating a scene task according to the 3D virtual scene or selecting a pre-formulated scene task.

Preferably, in the system for a mobile terminal to achieve user interaction by simulating a real scene, the transmitting module specifically comprises:

an uploading module, being for use by the mobile terminal to upload the information of the 3D virtual scene and the information of the scene task to the server;

a link allocation module, being for use by the server to receive and store the information of the 3D virtual scene and the information of the scene task to generate a shared link; and a responding module, being for use by the server to transmit the shared back to the mobile terminal.

Preferably, in the system for a mobile terminal to achieve user interaction by simulating a real scene, the searching and inviting module specifically comprises:

a location searching module, being for use by the mobile terminal to search for nearby users through use of a location sharing module;

an invitation sending module, being for transmitting the shared to the nearby mobile terminals to invite the nearby users to participate; and a waiting timing module, being for waiting for participation of the nearby users.

Preferably, the system for a mobile terminal to achieve user interaction by simulating a real scene further comprises:

an opinion collecting and re-formulating module, being for collecting opinions of the participating users to modify the virtual scene and the scene task.

In the method and the system for a mobile terminal to achieve user interaction by simulating a real scene according to the present disclosure, a 3D virtual scene corresponding to the real scene is set in the mobile terminal so that the mobile terminal is provided with a new interactive function. This provides the users with an interactive platform so that the users who are taking the same activity at the same time and in the same place can be gathered together in time via the platform to take part in a same activity together and to communicate with and know each other in the interaction of the activity.

DETAILED DESCRIPTION OF THE INVENTION

The present disclosure provides a method and a system for a mobile terminal to achieve user interaction by simulating a real scene. To make the objectives, technical solutions and effects of the present disclosure clearer and more definite, the present disclosure will be further detailed with reference to the attached drawings and examples hereinafter. It shall be appreciated that, the specific embodiments described herein are only for purpose of illustration rather than limitation.

The present disclosure works in the following principle: a user simulates a real scene of life through a mobile terminal and makes a virtual scene correspond to the real scene; when the user is in the real scene, the user searches for nearby users by means of the positioning sharing function of the mobile terminal, and sends an invitation to the nearby users via the mobile terminal to invite the nearby users to take part in a scene task of the virtual scene; after the nearby users accept the scene task, they complete the task in the real scene and the process is recorded in the virtual scene; and competitive and teamwork mechanisms can be adopted during the completion of the scene task to make the activity more interesting, and meanwhile, to have the user know other users sharing the same interests.

Figure 1:
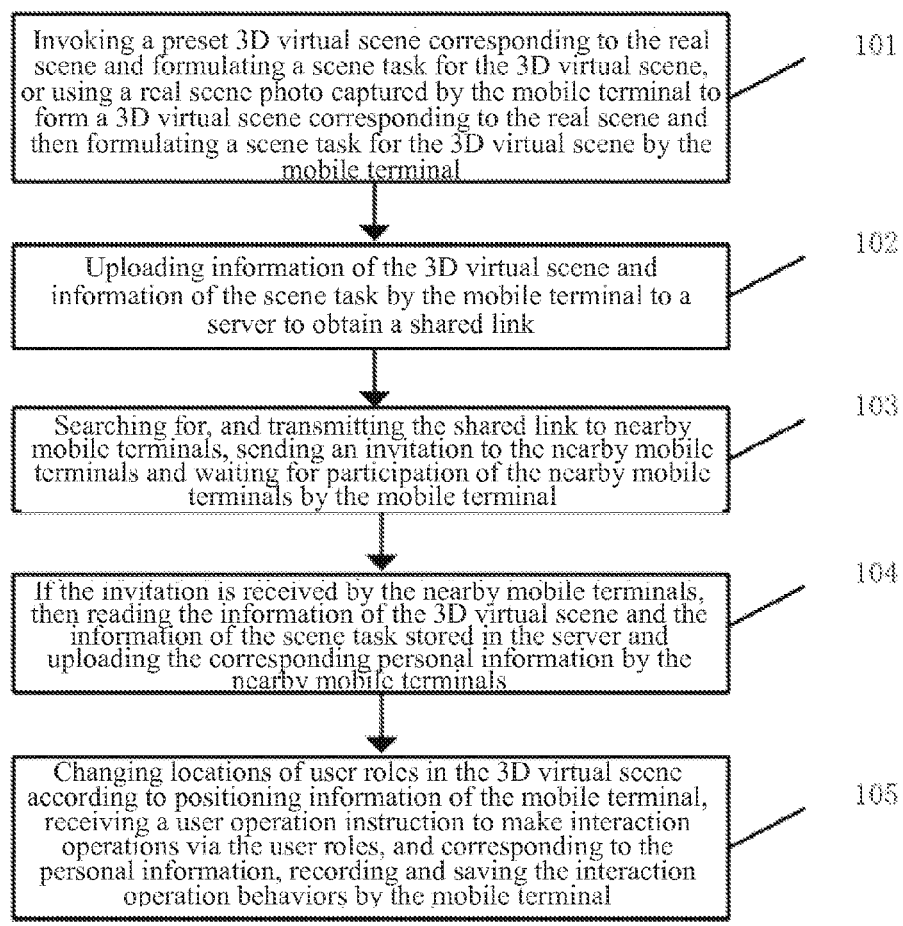
FIG. 1 is a flowchart diagram of a method for a mobile terminal to achieve user interaction by simulating a real scene according to the present disclosure.

FIG. 1 is a flowchart diagram of a method for a mobile terminal to achieve user interaction by simulating a real scene according to the present disclosure. As shown in FIG. 1, the method for a mobile terminal to achieve user interaction by simulating a real scene according to the present disclosure comprises the following steps.

101: invoking a preset 3D virtual scene corresponding to the real scene and formulating a scene task for the 3D virtual scene, or using a real scene photo captured by the mobile terminal to form a 3D virtual scene corresponding to the real scene and then formulating a scene task for the 3D virtual scene by the mobile terminal.

Specifically, before the step 101 is executed, a 3D virtual scene corresponding to the real scene needs to be set in the mobile terminal, e.g., a 3D virtual scene of the South Mountain, or a 3D virtual scene of the Lixiang Park. The 3D virtual scene described in the present disclosure refers to a panoramic display with certain routes highlighted therein, e.g., a panoramic display of a Baidu map. When the user is in the real scene, he/she can invoke a 3D virtual scene corresponding to the real scene via the mobile terminal and then formulate a scene task for the 3D virtual scene. For example, the scene task for the 3D virtual scene of the South Mountain may be as follows:

Start time of the task: Mar. 25, 2014 9:00

Number of participants: to be determined . . .

Task: finish climbing the South Mountain, and the one who takes the longest time loses and needs to hold a participants party with his/her money. Each participant shall feed locations back in real time via the Global Position System (GPS) during the activity, and take a picture at a designated site.

Designated site of the task: the red marker on the route of the 3D virtual scene.

The 3D virtual scene may also be formed by using a photo captured by the mobile terminal, and in this process the 3D virtual scene need to be pre-formulated by the user. Like the panoramic display, a panoramic view of each point on the route is acquired and then the points are connected together according to the trace thereof on the panoramic view, and then the 3D virtual scene is formed by enabling view angle rotation at each point. Of course, for the present disclosure, cooperation may be made with some software providers (e.g., Baidu) to obtain a Baidu panoramic map as the 3D virtual scene by adopting the Application Program Interface (API). No matter which way is adopted to obtain the 3D virtual scene, the user can formulate a scene task for the 3D virtual scene after the 3D virtual scene is obtained.

102: uploading the information of the 3D virtual scene and the information of the scene task by the mobile terminal to a server to obtain a shared link.

Specifically, in the step 102, the user uploads the information of the 3D virtual scene and the information of the scene task to a server after formulating the scene task for the 3D virtual scene in the mobile terminal, and the server receives and stores the information of the 3D virtual scene and the information of the scene task and then allocates a shared link. The shared link is used to access the server so as to obtain the information of the 3D virtual scene and the information of the scene task corresponding to the shared link.

103: searching for nearby mobile terminals and transmitting the shared link to the nearby mobile terminals, sending an invitation to the nearby mobile terminals and waiting for participation of the nearby mobile terminals by the mobile terminal.

Specifically, in the step 103, the mobile terminal searches for nearby users through a location information sharing technology. The location information sharing technology is to obtain the current location of the user via a positioning system of the mobile terminal and then display and share the obtained current location information of the user in a dialogue interface. In this way, the nearby users can obtain the location information of the user, and the user can also obtain the location information of the nearby users. This technology is relatively mature and has been applied to social networking platforms, e.g., QQ, Wechat, MoMo, etc. After the nearby users have been found, the mobile terminal sends the shared link to the nearby mobile terminals (i.e., the surrounding mobile terminals) and waits for participation of the nearby users. A waiting timing module is adopted in this process and the user who makes no response within a certain time period is regarded as giving up the chance to take part in the activity.

104: if the invitation is received by the nearby mobile terminals, then reading the information of the 3D virtual scene and the information of the scene task stored in the server and uploading the corresponding personal information by the nearby mobile terminals.

Specifically, in the step 104, if the invitation is received by the nearby users, then the nearby mobile terminals read the information of the 3D virtual scene and the information of the scene task stored in the server and uploads the corresponding personal information of the nearby users. After the personal information is uploaded, the participating users can communicate with each other. During the communication, opinions for the scene task can be proposed so as to modify or re-formulate the scene task. The nearby users can also voluntarily apply to participate the scene task.

105: changing locations of user roles in the 3D virtual scene according to positioning information of the mobile terminal, receiving a user operation instruction to make interaction operations via the user roles, and corresponding to the personal information, recording and saving the interaction operation behaviors by the mobile terminal.

Specifically, in the step 105, the user roles are virtual roles set in the 3D virtual scene and correspond to the users, and the user roles make interaction according to the 3D virtual scene and the scene task. During the execution of the task, the mobile terminal records the locations of the mobile terminals through positioning, and the locations of the user roles in the 3D virtual scene will be changed according to the positioning information of the mobile terminal. Moreover, the user may also perform operations on the mobile terminal so as to make interactions (e.g., chat) via the user roles. During the interactions, the mobile terminal records the user behaviors corresponding to the personal information in real time. During the execution of the scene task, the statuses of the users are detected in real time, e.g., to detect whether any participant withdraws from the task, and to detect whether the participants are executing the task according to the changes in position.

In the method for a mobile terminal to achieve user interaction by simulating a real scene, formulating a scene task for the 3D virtual scene specifically comprises:

formulating a scene task according to the 3D virtual scene or selecting a pre-formulated scene task, specifically as described above.

In the method for a mobile terminal to achieve user interaction by simulating a real scene, the step 102 specifically comprises: uploading the information of the 3D virtual scene and the information of the scene task to the server by the mobile terminal; receiving and storing the information of the 3D virtual scene and the information of the scene task by the server to generate a shared link; and transmitting the shared link back to the mobile terminal by the server, specifically as described above.

In the method for a mobile terminal to achieve user interaction by simulating a real scene, the step 103 specifically comprises: searching for nearby users by the mobile terminal through use of a location sharing module; transmitting the shared link to the nearby mobile terminals to invite the nearby users to participate; and waiting for participation of the nearby users, specifically as described above.

The method for a mobile terminal to achieve user interaction by simulating a real scene further comprises the follow step before the step E: collecting opinions of the participating users to modify the virtual scene and the scene task, specifically as described above.

Figure 2:
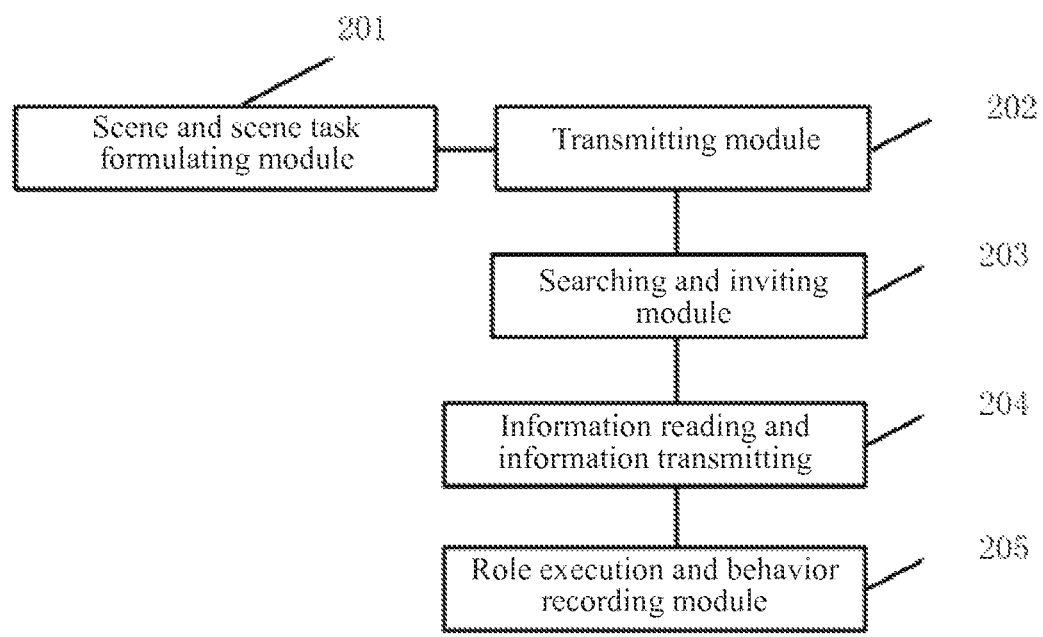
FIG. 2 is a structural view of a system for a mobile terminal to achieve user interaction by simulating a real scene according to the present disclosure.

FIG. 2 is a structural view of a system for a mobile terminal to achieve user interaction by simulating a real scene according to the present disclosure. As shown in FIG. 2, the present disclosure further provides a system for a mobile terminal to achieve user interaction by simulating a real scene, which comprises:

a scene and scene task formulating module 201 for use by the mobile terminal to invoke a preset 3D virtual scene corresponding to the real scene and formulate a scene task for the 3D virtual scene, or to use a real scene photo captured by the mobile terminal to form a 3D virtual scene corresponding to the real scene and then formulate a scene task for the 3D virtual scene, specifically as described above;

a transmitting module 202 for use by the mobile terminal to upload the information of the 3D virtual scene and the information of the scene task to a server to obtain a shared link, specifically as described above;

a searching and inviting module 203 for use by the mobile terminal to search for nearby users and transmit the shared link to the nearby mobile terminals, send an invitation to the nearby mobile terminals and wait for participation of the nearby users, specifically as described above;

an information reading and information transmitting module 204 for use by the nearby mobile terminals to, if the invitation is received by the nearby mobile terminals, read the information of the 3D virtual scene and the information of the scene task stored in the server and upload the corresponding personal information, specifically as described above; and a role execution and behavior recording module 205 for use by the mobile terminal to change locations of user roles in the 3D virtual scene according to positioning information of the mobile terminal, receive a user operation instruction to make interaction operations via the user roles, and corresponding to the personal information, record and save the interaction operation behaviors, specifically as described above.

In the system for a mobile terminal to achieve user interaction by simulating a real scene, formulating a scene task for the 3D virtual scene specifically comprises: formulating a scene task according to the 3D virtual scene or selecting a pre-formulated scene task, specifically as described above.

In the system for a mobile terminal to achieve user interaction by simulating a real scene, the transmitting module 202 specifically comprises:

an uploading module for use by the mobile terminal to upload the information of the 3D virtual scene and the information of the scene task to the server, specifically as described above;

a link allocation module for use by the server to receive and store the information of the 3D virtual scene and the information of the scene task to generate a shared link, specifically as described above; and a responding module for use by the server to transmit the shared link back to the mobile terminal, specifically as described above.

In the system for a mobile terminal to achieve user interaction by simulating a real scene, the searching and inviting module 203 specifically comprises:

a location searching module for use by the mobile terminal to search for nearby users through use of a location sharing module, specifically as described above;

an invitation sending module for transmitting the shared link to the nearby mobile terminals to invite the nearby uses to participate, specifically as described above; and a waiting timing module for waiting for participation of the nearby users, specifically as described above.

The system for a mobile terminal to achieve user interaction by simulating a real scene further comprises:

an opinion collecting and re-formulating module for collecting opinions of the participating users to modify the virtual scene and the scene task, specifically as described above.

According to the above descriptions, in the method and the system for a mobile terminal to achieve user interaction by simulating a real scene according to the present disclosure, a 3D virtual scene corresponding to the real scene is set in the mobile terminal so that the mobile terminal is provided with a new interactive function. This provides the users with an interactive platform so that the users who are taking the same activity at the same time and in the same place can be gathered together in time via the platform to take part in a same activity together and to communicate with and know each other in the interaction of the activity.

Furthermore, it is apparent to those skilled in the art, the present disclosure also provides a terminal device, which comprises a non-transitory program storage medium and a processor. The non-transitory program storage medium stores a program executed by the processor to perform the method as described in above. Furthermore, it is apparent to those skilled in the art that, the scene and scene task formulating module 201, the transmitting module 202, the searching and inviting module 203, the information reading and information transmitting module 204, and the role execution and behavior recording module 205 of the mobile terminal as shown in FIG. 2 are software modules or software units. In another aspect, it is well-known that various software modules and various software units inherently are stored in the non-transitory program storage medium and executed by the processor to perform the related functions respectively.

Similarly, the uploading module, the link allocation module and the responding module of the transmitting module, the location searching module, the invitation sending module and the waiting timing module of the searching and inviting module, and the opinion collecting and re-formulating module are software modules or software units, which are stored in non-transitory program storage medium and executed by the processor to perform the related functions respectively.

It shall be understood that, application of the present disclosure is not limited to what illustrated above; and instead, modifications or alterations may be made by those of ordinary skill in the art upon reviewing the above descriptions, and all such modifications and alterations shall fall within the scope of the present disclosure.

What is claimed is:

1. A method for a mobile terminal to achieve user interaction by simulating a real scene, comprising the following steps of:

A. invoking a preset 3D virtual scene corresponding to the real scene and formulating a scene task for the 3D virtual scene, or using a real scene photo captured by the mobile terminal to form a 3D virtual scene corresponding to the real scene and then formulating a scene task for the 3D virtual scene by the mobile terminal;

B. uploading information of the 3D virtual scene and information of the scene task by the mobile terminal to a server to obtain a shared link;

C. searching for nearby mobile terminals and transmitting the shared link to the nearby mobile terminals, sending an invitation to the nearby mobile terminals and waiting for participation of the nearby mobile terminals by the mobile terminal;

D. if the invitation is received by the nearby mobile terminals, then reading the information of the 3D virtual scene and the information of the scene task stored in the server and uploading the corresponding personal information by the nearby mobile terminals; and E. changing locations of user roles in the 3D virtual scene according to positioning information of the mobile terminal, receiving a user operation instruction to make interaction operations via the user roles, and corresponding to the personal information, recording and saving the interaction operation behaviors by the mobile terminal.

2. The method for a mobile terminal to achieve user interaction by simulating a real scene of claim 1, wherein the step of formulating a scene task for the 3D virtual scene specifically comprises:
   formulating a scene task according to the 3D virtual scene or selecting a pre-formulated scene task.

3. The method for a mobile terminal to achieve user interaction by simulating a real scene of claim 1, wherein the step B specifically comprises:
   B1. uploading the information of the 3D virtual scene and the information of the scene task to the server by the mobile terminal;
   B2. receiving and storing the information of the 3D virtual scene and the information of the scene task by the server to generate a shared link; and
   B3. transmitting the shared link back to the mobile terminal by the server.

4. The method for a mobile terminal to achieve user interaction by simulating a real scene of claim 1, wherein the step C specifically comprises:
   C1. searching for nearby users by the mobile terminal through use of a location sharing module;
   C2. transmitting the shared link to the nearby mobile terminals to invite the nearby users to participate; and
   C3. waiting for participation of the nearby users.

5. The method for a mobile terminal to achieve user interaction by simulating a real scene of claim 1, wherein the scene task comprises: start time of task, number of participants, task, designated site of task.

6. The method for a mobile terminal to achieve user interaction by simulating a real scene of claim 1, wherein the step of searching for nearby mobile terminals is performed by the location information sharing technology.

7. The method for a mobile terminal to achieve user interaction by simulating a real scene of claim 1, wherein if a user of any of the nearby mobile terminals makes no response to the invitation within a certain time period, it regards that the user gives up an chance to take part in the scene task.

8. A method for a mobile terminal to achieve user interaction by simulating a real scene, comprising the following steps of:
   A. invoking a preset 3D virtual scene corresponding to the real scene and formulating a scene task for the 3D virtual scene, or using a real scene photo captured by the mobile terminal to form a 3D virtual scene corresponding to the real scene and then formulating a scene task for the 3D virtual scene by the mobile terminal;
   B. uploading information of the 3D virtual scene and information of the scene task by the mobile terminal to a server to obtain a shared link;
   C. searching for nearby mobile terminals and transmitting the shared link to the nearby mobile terminals, sending an invitation to the nearby mobile terminals and waiting for participation of the nearby mobile terminals by the mobile terminal;
   D. if the invitation is received by the nearby mobile terminals, then reading the information of the 3D virtual scene and the information of the scene task stored in the server and uploading the corresponding personal information by the nearby mobile terminals;
   E0: collecting opinions of participating users to modify the virtual scene and the scene task; and
   E. changing locations of user roles in the 3D virtual scene according to positioning information of the mobile terminal, receiving a user operation instruction to make interaction operations via the user roles, and corresponding to the personal information, recording and saving the interaction operation behaviors.

9. The method for a mobile terminal to achieve user interaction by simulating a real scene of claim 8, wherein the step of formulating a scene task for the 3D virtual scene specifically comprises:
   formulating a scene task according to the 3D virtual scene or selecting a pre-formulated scene task.

10. The method for a mobile terminal to achieve user interaction by simulating a real scene of claim 8, wherein the step B specifically comprises;
    B1. uploading the information of the 3D virtual scene and the information of the scene task to the server by the mobile terminal;
    B2. receiving and storing the information of the 3D virtual scene and the information of the scene task by the server to generate a shared link; and
    B3. transmitting the shared link back to the mobile terminal by the server.

11. The method for a mobile terminal to achieve user interaction by simulating a real scene of claim 8, wherein the step C specifically comprises:
    C1. searching for nearby users by the mobile terminal through use of a location sharing module;
    C2. transmitting the shared link to the nearby mobile terminals to invite the nearby users to participate; and
    C3. waiting for participation of the nearby users.

12. The method for a mobile terminal to achieve user interaction by simulating a real scene of claim 8, wherein the scene task comprises: start time of task, number of participants, task, designated site of task.

13. The method for a mobile terminal to achieve user interaction by simulating a real scene of claim 8, wherein the step of searching for nearby mobile terminals is performed by the location information sharing technology.

14. The method for a mobile terminal to achieve user interaction by simulating a real scene of claim 8, wherein if a user of any of the nearby mobile terminals makes no response to the invitation within a certain time period, it regards that the user gives up a chance to take part in the scene task.

15. A system for a mobile terminal to achieve user interaction by simulating a real scene, comprising:
    a scene and scene task formulating module, being for use by the mobile terminal to invoke a preset 3D virtual scene corresponding to the real scene and formulate a scene task for the 3D virtual scene, or to use a real scene photo captured by the mobile terminal to form a 3D virtual scene corresponding to the real scene and then formulate a scene task for the 3D virtual scene;
    a transmitting module, being for use by the mobile terminal to upload information of the 3D virtual scene and information of the scene task to a server to obtain a shared link;
    a searching and inviting module, being for use by the mobile terminal to search for nearby mobile terminals and transmit the shared link to the nearby mobile terminals, send an invitation to the nearby mobile terminals and wait for participation of the nearby mobile terminals;
    an information reading and information transmitting module, being for use by the nearby mobile terminals to, read the information of the 3D virtual scene and the information of the scene task stored in the server and upload the corresponding personal information if the invitation is received by the nearby mobile terminals; and a role execution and behavior recording module, being for use by the mobile terminal to change locations of user roles in the 3D virtual scene according to positioning information of the mobile terminal, receive a user operation instruction to make interaction operations via the user roles, and corresponding to the personal information, record and save the interaction operation behaviors.

16. The system for a mobile terminal to achieve user interaction by simulating a real scene of claim 15, wherein formulating a scene task for the 3D virtual scene specifically comprises:

formulating a scene task according to the 3D virtual scene or selecting a pre-formulated scene task.

17. The system for a mobile terminal to achieve user interaction by simulating a real scene of claim 15, Wherein the transmitting module specifically comprises:

an uploading module, being for use by the mobile terminal to upload the information of the 3D virtual scene and the information of the scene task to the server;

a link allocation module, being for use by the server to receive and store the information of the 3D virtual scene and the information of the scene task to generate a shared link; and a responding module, being for use by the server to transmit the shared link back to the mobile terminal.

18. The system for a mobile terminal to achieve user interaction by simulating a real scene of claim 15, wherein the searching and inviting module specifically comprises:

a location searching module, being for use by the mobile terminal to search for nearby users through use of the location sharing module;

an invitation sending module, being for transmitting the shared link to the nearby mobile terminals to invite the nearby users to participate; and a waiting timing module, being for waiting for participation of the nearby users.

19. The system for a mobile terminal to achieve user interaction by simulating a real scene of claim 15, further comprising:

an opinion collecting and re-formulating module, being for collecting opinions of the participating users to modify the virtual scene and the scene task.

* * * * *